UNITED STATES PATENT OFFICE.

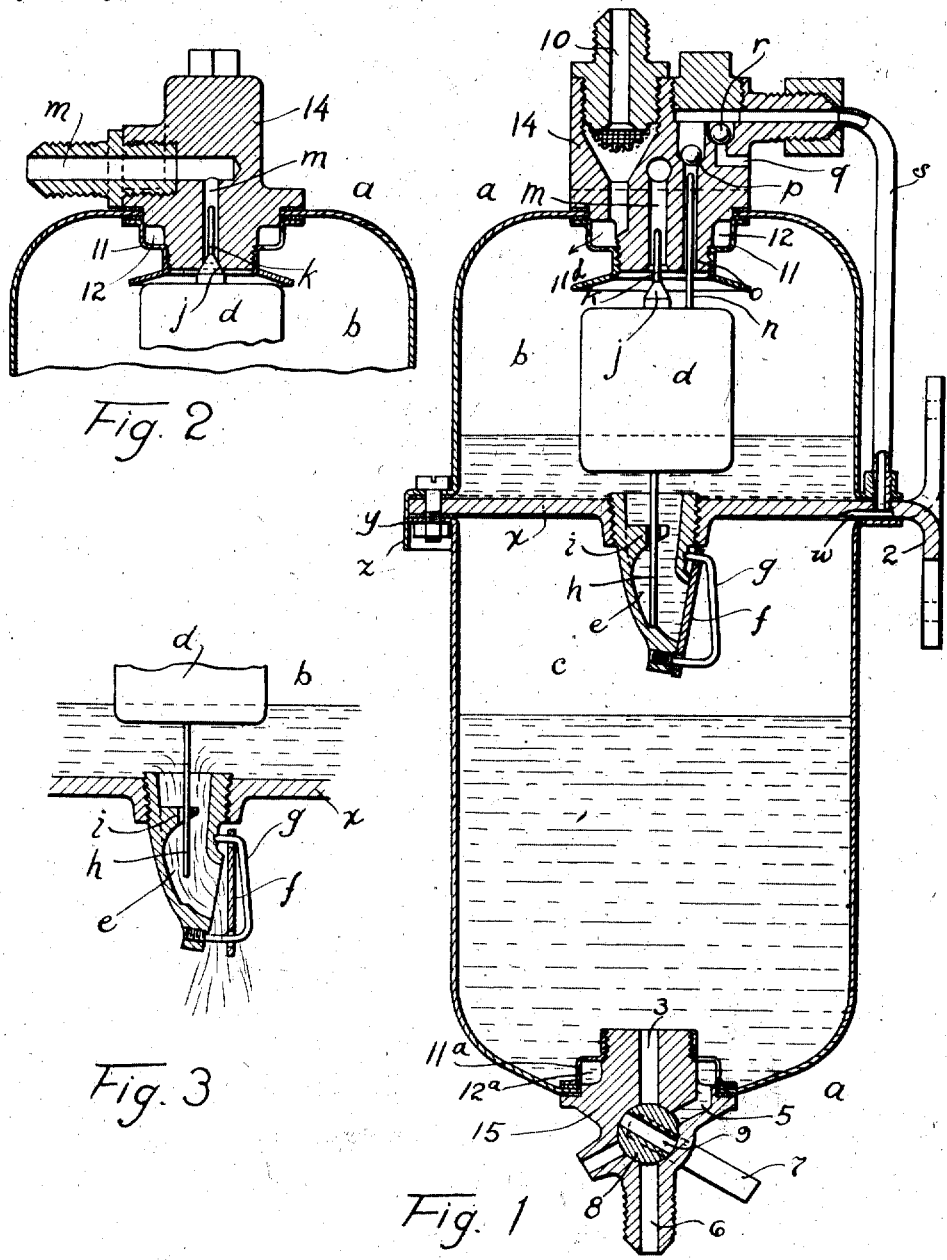

FREDERICK WEINBERG, OF DETROIT, MICHIGAN.

VACUUM FEED SYSTEM.

1,229,360. Specification of Letters Patent. Patented June 12, 1917.

Application filed November 15, 1915. Serial No. 61,535.

*To all whom it may concern:*

Be it known that I, FREDERICK WEINBERG, a citizen of the United States, residing at Detroit, county of Wayne, State of Michigan, have invented a certain new and useful Improvement in Vacuum Feed Systems, and declare the following to be a full, clear, and exact description of the same, such as will enable others skilled in the art to which it pertains to make and use the same, reference being had to the accompanying drawings, which form a part of this specification.

My invention relates to apparatus for vacuum feed system for internal combustion engines and an object of my improvements is to provide an apparatus that shall be simple in construction, easily assembled, cheap to make, and efficient in operation, as well as securing compactness.

I secure this object in the device illustrated in the accompanying drawings in which, Figure 1 is a sectional elevation of an apparatus embodying my invention.

Fig. 2 is a part sectional view at right angles to the section of Fig. 1.

Fig. 3 is a detailed sectional view showing the discharge valve in a different position to that shown in Fig. 1.

$a$ is the usual auxiliary tank used in such apparatus. This is divided into the upper chamber $b$ and the lower chamber $c$. The upper chamber is the vacuum chamber into which the liquid fuel is at first drawn, and $c$ is the reservoir or chamber into which the liquid fuel is discharged from the chamber $b$ and from which the fuel is normally supplied to the carbureter of the engine. $d$ is a float in the chamber $b$ having a downwardly extending rod $h$ passing through and reciprocating in an aperture in a lug $i$ in the conduit $e$ forming a communication between the chamber $b$ and reservoir $c$. $f$ is a non-return valve. This valve is provided with a central aperture near its upper edge and a similar one near its lower edge. $g$ is a wire secured at its lower end in the casting $e$ passing through the lower aperture in the valve disk $f$, then turning upward and passing through the aperture near the upper edge of said disk and at its upper end again joining the conduit $e$. The valve $f$ normally hangs in a vertical position away from its seat, as shown in Fig. 3, but when a vacuum is formed in the chamber $b$ the valve $f$ is thereby drawn to its seat closing the passage through the conduit $e$.

14 is a plug which may be of cast material and finished in the lathe where required. The plug 14 extends into an aperture through the upper wall of the chamber $b$ and is secured air-tight therein by a nut 11 which is screw-threaded for a part of its bore and at this part engages screw-threads upon an extension from the plug 14. The nut 11 is expanded beyond its screw-threaded part at about half its length to form a chamber 12 within its enlargement and at its inner edge being bent outward to form a flange which engages the wall of the chamber $b$ to secure the plug 14 in place, there being the usual shoulder and interposing washers used in such construction. The other end of the nut 11 is expanded to form a deflecting portion $11^d$.

There is an aperture $m$ extending vertically in the plug 14 and opening at the lower end of said plug where it is provided with a conical valve seat. The opening, or passage, $m$ turns at right angles at its upper end and extends laterally to engage a pipe, not shown, which shall be connected with a means for producing a vacuum in a way well understood in the art and therefore not herein specifically described.

$j$ is a valve extending upward from the float $d$ and adapted to close the lower end of the passage $m$ when the level of the liquid in the chamber $b$ has risen to such an extent as to carry the valve $d$ upward until the valve $j$ engages the valve seat at the lower end of the passage $m$. $k$ is a rod extending upward from the valve $j$ into the passage $m$ which may serve as a guide for the float $d$.

$o$ is a passage extending vertically upward from the lower end of the plug 14 and connecting with a pipe $s$ at its upper end which pipe communicates at its lower end with the reservoir $c$. $p$ is a ball valve resting upon the upper end of the passage $o$ and opening toward the pipe $s$. $n$ is a rod extending upward from the float $d$ into the passage $o$ and adapted to strike against and raise the valve $f$ when the float $d$ has been raised to a sufficient extent by a rise of level of the liquid in the chamber $b$ $q$ is an aperture in the plug 14 opening at the side of said plug at one end, and at the other end communicating with the passage $o$ and pipe $s$. $r$ is a ball valve opening inward and seated upon the inner end of the passage $q$.

10 is a passage in the plug 14 which is adapted to be connected with a supply tank. The passage 10 opens into chamber 12 formed by the enlargement of the nut 11.

15 is a plug closing an aperture through the lower wall of the reservoir $c$. The plug 15 is held in position by a nut 11ª of the same construction as the nut 11, above described, and forming a chamber 12ª entirely analogous to the chamber 12, above described. The plug 15 extends upward into the reservoir $c$ so that any water that may accumulate in said reservoir will rest in the bottom of said reservoir $c$ below the upper end of said plug.

3 is an aperture or passage extending downward from the upper end of the plug 15 into a central cylindrical cavity in which is the turn-plug 8 of a cock having diametral passage 9 therethrough. 6 is a passage extending downward in the plug 15 and adapted to communicate with the carbureter for supplying gasolene thereto.

5 is an aperture in the plug 15 communicating with the central cavity in said plug, and opening laterally in a delivery spout therefrom at one end and at the other end opening into the reservoir $c$ through the chamber 12ª formed by the nut 11ª. The opening from the passage 5 into the reservoir $c$ is at the lower end of said reservoir below the upper end of the plug 15.

7 is a handle, or operating part, for the plug 8. The plug 8 may be turned to place the passage 3 into communication with the passage 6 for supplying gasolene to the carbureter, or it may be turned to close the connection between the passages 3 and 6 and form a continuous passage through 5 so that the water that may have accumulated in the bottom of the reservoir $c$ may be discharged therefrom.

The shell of the tank $a$ is made up of an upper and lower part which are joined together by being secured upon opposite sides of the metal disk $x$. The upper portion of the shell of said tank has a flange $z$ formed thereon, which for the greater part of the periphery, extends over the edge of the disk $x$ and downward below the lower surface of said disk. There is a flange $y$ formed around the upper edge of the lower part of the shell of the tank $a$. The two parts of said shell are secured to the disk $x$ by said flanges and by nuts and bolts.

$w$ is a groove formed in the lower surface of the disk $x$. The pipe $s$ communicates with said groove and therethrough with the reservoir $c$. 2 is a turned-over portion of the disk $x$ extending laterally as a lug therefrom, by which lug the tank $a$ may be secured to a stationary support.

The nuts 11 and 11ª have apertures in their walls forming communications between the chambers 12 and $b$ and 12ª and reservoir $c$. The flaring portion 11ᵈ of the nut 11 extends over the float $d$ and prevents the incoming liquid from falling on said float.

The operation of the above described device is as follows; it being understood that the passage 10 is in communication with a supply tank.

The liquid fuel falls in the chamber $b$ until the float $d$ has carried the valve $j$ away from its seat and has allowed the ball $p$ to rest upon its seat closing the passage $o$. A vacuum is drawn in the chamber $b$ through the passage $m$ causing the liquid to flow into said chamber through the passage 10 and chamber 12 until the float $d$ rises pushing the ball $p$ from its seat and putting the chamber $b$ into connection with the reservoir $c$ thus immediately equalizing the pressures in said chamber and reservoir and therefore permitting the liquid to flow by gravity from the chamber $b$.

The float $d$, rising farther, causes the valve $j$ to seat at the lower end of the passage $m$ thus closing the vacuum producing passage. The valve $r$ rises and restores approximately atmospheric pressure by admitting air through the passage $q$.

The valve $p$ will resist removal from its seat both because of its weight and because of the excess of pressure on its outer surface, so that the level of the liquid in the chamber $b$ will rise somewhat after the motion of the float $d$ has been checked by said valve and when the valve has been unseated, the float will be raised quickly bringing the valve $j$ promptly to its seat.

When the level of the liquid in $b$ falls the valve $j$ will be held to its seat by the excess of pressure on its lower surface thus preventing the valve $j$ from descending and when said valve is unseated the float will fall quickly promptly seating the valve $p$.

What I claim is:

1. In an apparatus of the kind described, a vacuum chamber having an aperture in its upper wall, a vacuum producing passage, a pressure equalizing passage, a plug closing said aperture, a passage extending vertically from said chamber in said plug and communicating with the vacuum producing passage, a passage extending vertically from said chamber in said plug and communicating with the pressure equalizing passage, a float in said chamber, a valve on said float adapted to close the lower end of the first mentioned vertically extending passage, an outwardly opening non-return valve adapted to close the last mentioned vertically extending passage and a rod extending from said float into the last named vertically extending passage adapted to unseat said valve.

2. In an apparatus of the kind described, a vacuum chamber having an aperture in its upper wall, a vacuum producing passage, a pressure equalizing passage, a plug closing said aperture, a passage extending vertically from said chamber in said plug, and communicating with the vacuum producing passage, a passage extending vertically in said plug and communicating with the pressure equalizing passage, a float in said chamber, a valve on said float adapted to close the lower end of the first mentioned vertically extending passage, an outwardly opening non-return valve adapted to close the last mentioned vertically extending passage and a rod extending from said float into the last named vertically extending passage adapted to unseat said valve, a passage in said plug opening to the outer air at the side thereof and opening to said equalizing passage and provided with an automatic inwardly opening check valve.

3. In an apparatus of the kind described, a vacuum chamber having an aperture in the upper wall, a vacuum producing passage, a pressure equalizing passage, a plug closing said aperture, a passage extending vertically from said chamber in said plug, and communicating with the vacuum passage, a passage extending vertically from said chamber in said plug and communicating with the pressure equalizing passage, a float in said chamber, a valve on said float adapted to close the lower end of the first mentioned vertically extending passage, an outwardly opening non-return valve adapted to close the last mentioned vertically extending passage, and a rod extending from said float into the last named vertically extending passage adapted to unseat said valve, and a fuel supply passage in said plug opening into said chamber.

4. In an apparatus of the kind described, the combination of a disk $x$, a bell-shaped shell secured with its open end upon said disk and closed thereby, an inverted bell-shaped shell below said disk having its open end secured against and closed by said disk, a space between said disk and the flange of the lower bell-shaped shell, and a pipe $s$ constituting an equalizing passage communicating with said space and with the upper portion of the chamber formed by the first mentioned shell.

5. In an apparatus of the kind described, a reservoir $c$, a plug extending through the lower end of said reservoir and a short distance upward into said reservoir, a discharge orifice ex ending from the upper end of said plug and adapted to convey the liquid fuel to a carbureter, a passage extending from the side of said plug at the lower end of said reservoir and opening to the outside of said plug, and a cock located in said plug and adapted to close either one of said passages and open the other of said passages.

6. In an apparatus of the kind described, a chamber, a plug extending into said chamber, said plug being provided with a screw-threaded part in said chamber, a nut engaging said screw-threaded part and expanding to form a chamber between its wall and the wall of said plug, and a passage opening through said plug and into the last named chamber.

7. In an apparatus of the kind described, a disk $x$ extending laterally to form a securing lug 2, a bell-like shell secured above and a bell-like shell secured below said disk, substantially as shown and described.

8. In an apparatus of the kind described, a disk $x$ extending laterally to form a securing lug 2, a bell-shaped shell secured above, and a bell-shaped shell secured below said disk, said disk being provided with an aperture within said shells, and a conduit $e$ engaging in said aperture.

9. In an apparatus of the kind described, a vacuum chamber having an aperture in the upper wall thereof, a plug in said aperture, a supply passage for liquid fuel opening through said plug, an operating float in said chamber adapted to reciprocate below said plug, and a deflecting plate extending over said float and below the delivery end of said supply passage.

10. In an apparatus of the kind described, a vacuum chamber having an aperture in the upper wall thereof, a plug extending through said aperture, a supply passage for liquid fuel through said plug, an operating float adapted to reciprocate below said plug, said plug being provided with a screw-threaded part in said chamber, a nut engaging said screw-threaded end expanding to form a chamber between its wall and the wall of said plug, said supply passage opening into the last named chamber, and a deflecting plate extending over said float.

11. In an apparatus of the kind described, a vacuum chamber, a vacuum producing passage opening through the top of said chamber, an equalizing passage opening through the top of said chamber, a float in said chamber, a valve secured directly to said float and adapted to close the lower end of the vacuum producing passage when the float rises, a valve in said equalizing passage, a projection from said float adapted to unseat the last named valve when the float rises, the valve in the equalizing passage being adapted to resist a force tending to open it, said float being actuated by the action of the liquid in said chamber and difference of pressure on the valve in the equalizing passage.

12. In an apparatus of the kind described, a vacuum chamber, an equalizing passage opening from said chamber, an outwardly opening valve in said passage, a float in said chamber and a projection adapted to strike against said valve and raise it from its seat, said valve being adapted to resist a force tending to open it, said float being actuated by the action of the liquid in said chamber and difference of pressure on the valve in the equalizing passage.

13. In an apparatus of the kind described, a disk $x$, a shell secured to either side of said disk by means of flanges, a space between the disk and flange of the lower shell, and a pipe connecting with said space and extending upward.

14. In an apparatus of the kind described, a disk $x$, a shell secured to either side forming two chambers, interposed packing washers between the flanges of said shells and said disk, said shells and said disk being fastened together at their edges.

15. In an apparatus of the kind described, a disk $x$, a shell secured on either side forming two chambers, said disk having a flange for supporting said apparatus.

In testimony whereof, I sign this specification.

FREDERICK WEINBERG.